United States Patent [19]

Iltis et al.

[11] Patent Number: 5,176,890
[45] Date of Patent: Jan. 5, 1993

[54] PREPARATION OF RARE EARTH BORIDES

[75] Inventors: Alain Iltis, Aubervilliers; Patrick Maestro, Cergy Saint-Christophe, both of France

[73] Assignee: Rhone-Poulenc Chimie, Courbevoie, France

[21] Appl. No.: 276,664

[22] Filed: Nov. 28, 1988

[30] Foreign Application Priority Data

Nov. 26, 1987 [FR] France .................. 87 16396

[51] Int. Cl.⁵ ............................. C01F 17/00
[52] U.S. Cl. .................... 423/263; 423/289
[58] Field of Search .................. 423/263, 289

[56] References Cited

U.S. PATENT DOCUMENTS

| | | | |
|---|---|---|---|
| 3,258,316 | 6/1968 | Tepper et al. | 423/289 |
| 3,784,677 | 1/1974 | Versteeg et al. | 423/252 |
| 3,902,973 | 9/1975 | Gomes et al. | 204/145 |
| 3,979,500 | 9/1976 | Sheppard et al. | 423/289 |
| 4,260,525 | 4/1981 | Olsen et al. | 252/521 |
| 4,999,176 | 3/1991 | Iltis et al. | 423/263 |

Primary Examiner—John Niebling
Assistant Examiner—Brian M. Bolam
Attorney, Agent, or Firm—Burns, Doane, Swecker & Mathis

[57] ABSTRACT

The rare earth borides, e.g., the tetraborides and hexaborides of lanthanum, cerium and praseodymium, are directly prepared by heating/reacting a mixture of at least one rare earth chloride and elemental boron at an elevated temperature, e.g., a temperature ranging from 1,200° to 1,500° C.

4 Claims, No Drawings

PREPARATION OF RARE EARTH BORIDES

BACKGROUND OF THE INVENTION

1. Field of the Invention

The present invention relates to the preparation of rare earth borides.

By the expression "rare earths" are intended the rare earth elements designated the lanthanides, having atomic numbers of from 57 to 71, as well as yttrium which has an atomic number of 39.

2. Description of the Prior Art

The rare earth borides are compounds which have desirable electrical properties. In particular, lanthanum hexaboride has excellent properties of thermionic emission and is used as an emissive cathode in high energy devices.

Presently, the industrial production of the rare earth borides is limited by the difficulty in preparing a product of satisfactory purity by a process that may be extrapolated to an industrial scale.

It is known to prepare lanthanum boride by reducing lanthanum sesquioxide by means of boron carbide or elemental boron, under reduced pressure [G. A. Meerson et al, *Izv. Akad. Nauk. SSSR Neorg. Mater.* 3, No. 5, pp. 802-806 (1967)]. However, the reaction is carried out at elevated temperatures; this not only mandates use of a graphite crucible, but also a graphite lined furnace must be used.

It has also been proposed, in U.S. Pat. No. 3,902,973, to prepare the rare earth borides by electrolysis of a source of the rare earths, in a molten salt medium containing a cryolite and an alkali metal borate. Such a process is relatively complex in light of the electrolysis temperature of 950° to 1,050° C., and it presents the usual problem of recovering the rare earth boride at the cathode, which entails a pollution problem due to the cryolyte.

The same problem of separation of the final product rare earth boride characterizes the process described in U.S. Pat. No. 4,260,525. This particular process includes mixing a rare earth carbonate, nitrate or oxide with boron, in the presence of aluminum, to dissolve the boron at a temperature of from 1,200° to 1,600° C., heating the reaction medium within such temperature range, cooling it, and then separating the rare earth boride from the aluminum oxide formed.

SUMMARY OF THE INVENTION

Accordingly, a major object of the present invention is the provision of an improved process for the direct preparation of the rare earth borides by heating together a rare earth chloride and elemental boron, which improved process conspicuously ameliorates those problems of separation and purification to date characterizing the state of this art.

Briefly, the present invention features the preparation of rare earth borides according to the following reaction scheme (1):

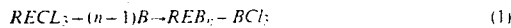

$$RECl_3 + (n-1)B \rightarrow REB_n + BCl_3 \qquad (1)$$

wherein RE represents the rare earth and $\underline{n}$ represents the number of boron atoms per atom of rare earth; $\underline{n}$ is typically equal to 4 or 6.

DETAILED DESCRIPTION OF THE PREFERRED EMBODIMENTS OF THE INVENTION

More particularly according to the present invention, the subject process permits the direct preparation of the desired rare earth borides, as the only secondary compound produced is boron chloride, which under the conditions of the reaction is volatile.

Another advantage of the process of the invention is that it may be carried out in conventional apparatus, i.e., a furnace including refractory bricks of alumina or aluminosilicate, as the temperature of reaction is relatively low. Such temperature is typically lower than 1,500° C. and preferably around 1,200° C.

According to the process of the invention, a rare earth chloride in the anhydrous or hydrate form, or a mixture of at least two rare earth chlorides, is used as one starting material.

It is desirable that the chloride used be of a high purity and, in particular, be free of oxygenated impurities, such as a residual oxide.

Preferably, an optionally hydrated rare earth chloride of a purity greater than 95% is used.

However, the presence of an oxychloride and water is not detrimental to the course of the reaction, and a total amount of such materials not exceeding 20% by weight may be tolerated.

In a preferred embodiment of the invention, the rare earth chloride is subjected to a drying operation, which may be carried out at a temperature of from 20° to 200° C., preferably around 100° C. Such drying may be carried out in air and preferably under a reduced pressure, for example, from 1 mm mercury (=133.322 Pa) to 100 mm mercury (13,322 Pa).

The duration of the drying operation advantageously ranges from 2 to 24 hours.

As regards the boron starting material, elemental boron in either the amorphous or crystalline state may be used.

Preferably, boron free of oxide impurities is used. Metallic impurities are tolerated and, preferably, any boron having a purity of 85% or more may be used.

The amounts of the rare earth chloride and the boron employed are such that the molar ratio of boron to the rare earth chloride is preferably at least equal to the stoichiometric amount. Even more preferably, such ratio reflects a slight deficiency of up to 10 to 20% of the stoichiometric amount.

The first stage of the process of the invention entails intimately admixing the rare earth chloride with the boron, by either a wet or dry process.

The mixture of powders thus produced is then subjected to a heat treatment at an elevated temperature. The reaction is carried out at a temperature of from 1,200° to 1,500° C., and preferably at a temperature of from 1,250° to 1,300° C.

The reaction is carried out at atmospheric pressure, but under an atmosphere of reducing and/or inert gases. Thus, hydrogen or argon may be used, whether alone or in a mixture.

The aforesaid gaseous atmosphere is maintained throughout the reaction.

The duration of the reaction is a function of the capacity of the apparatus and its capability to accommodate a rapid increase in temperature. Generally, once the desired temperature is attained, it is maintained for a duration of from 1 to 4 hours and preferably from 1 h to 2 h.

During the reaction, a rare earth boride is formed and a gas is released, which may be boron chloride, possibly accompanied by boron oxychloride, which may be captured (for example, by bubbling it through water).

The reaction mass is then cooled to ambient temperature (15° to 25° C.). This is carried out under a reducing and/or inert atmosphere while the temperature is not lower than 600° C.

The rare earth boride is recovered directly.

It may be desirable to wash the chlorides that may be present, as impurities, out of the final product, with water, either once or several times, preferably one to three times. For such purpose, the reaction product is suspended in water and separated by conventional methods of solid/solid separation, in particular filtration, settling, draining, and the like.

According to the process of the invention, a rare earth boride is directly obtained. Most typically, it is a rare earth hexaboride or tetraboride, depending on the stoichiometric amounts of the starting materials. The rare earth hexaboride has a cubic elementary lattice of the CsCl type. The rare earth tetraboride crystallizes in the quadratic system.

The process of the invention may be carried out in a conventional apparatus.

The admixing of the rare earth chloride and the boron may be carried out in a powder mixer of known type: free-fall mixers of the drum type, vertical or horizontal helical screw mixers, horizontal Lodige type mixers, and the like.

The resulting admixture is placed into a boat or crucible of alumina, zirconium, vitrous carbon or, preferably, graphite, and the entire assembly is introduced into a chamber, tunnel, muffle or rotating furnace having a conventional refractory lining (alumina or aluminosilicate). The furnace is equipped with means to regulate the temperature during the heat treatment. It must be tight and permit circulation of gases (hydrogen, inert gas). Means to recover the evolved gases should be provided, for example a wash tower.

In order to further illustrate the present invention and the advantages thereof, the following specific examples are given, it being understood that same are intended only as illustrative and in nowise limitative.

EXAMPLE 1

Preparation of Cerium Hexaboride

The operation was begun by drying cerium chloride, $CeCl_3 \cdot 7H_2O$ (99.5% purity) for 24 h at 100° C. and under a reduced pressure of 1,000 Pa.

27.35 g of this compound were mixed with 6.48 g crystalline boron, marketed by PROLABO, having a purity of 98% and a grain size distribution of 25 to 63 microns.

The mixture was then introduced into a graphite crucible which was then placed into a tubular furnace having an alumina refractory lining, and argon containing 10% by volume of hydrogen was circulated therein.

The temperature was increased to 1,300° C. and maintained at this temperature for 2 h.

The reaction mass was then permitted to cool in the furnace, with the circulation of the gaseous atmosphere being continued until the temperature decreased to less than 600° C.

19.00 g of blue-violet product were obtained.

The product was then washed by suspension in water, to eliminate an trace amounts of chloride.

The product obtained was cerium hexaboride having an X-ray diffraction pattern conforming to ASTM plate 11670.

A powder having a mean particle diameter of 8 microns, and 4 microns after comminution of the aggregates by ultrasound for 2 min, was produced.

EXAMPLE 2

Preparation of Lanthanum Hexaboride

The starting material was lanthanum chloride prepared from 99.9% lanthanum oxide and hydrochloric acid.

The lanthanum chloride obtained was dried for 24 h at a temperature of 100° C. and under a reduced pressure of 1,000 Pa.

A mixture of 15 g of such compound with 4.62 g crystalline boron was prepared.

The mixture was then introduced into a graphite crucible, which was placed into a tubular furnace, in which a circulation of argon and hydrogen was maintained.

The temperature was raised to 1,250° C. and maintained for 2 h.

The reaction mass was permitted to cool in the inert atmosphere of the furnace, with the gas circulation being maintained until the temperature decreased below 600° C.

The product obtained was washed in water.

The product, which was blue in color, was lathanum hexaboride having an X-ray diffraction pattern corresponding to ASTM plate 34427.

EXAMPLE 3

Preparation of Praseodymium Hexaboride

Dehydrated praseodymium chloride was prepared by the procedure of Example 1.

A mixture of 11 g of such compound with 3.059 g crystalline boron was prepared.

The mixture was then introduced into a graphite crucible, which was placed into a tubular furnace, in which a circulation of argon and hydrogen was established.

The temperature was increased to 1,250° C. and maintained for 2 h.

The reaction mass was then permitted to cool in the inert atmosphere of the furnace and the gas circulation was maintained until the temperature decreased to less than 600° C.

The product obtained was washed in water.

The product, which was blue in color, was praseodymium hexaboride having an X-ray diffraction pattern corresponding to ASTM plate 251455.

EXAMPLE 4

Preparation of Cerium Hexaboride

Cerium chloride, $CeCl_3 \cdot 7H_2O$ (99.5% pure) was dried for 24 h at 100° C., under a reduced pressure of 1,000 Pa.

A mixture of 8 g of such compound with 2.6039 g amorphous industrial boron containing 85% boron and 12% magnesium and having a particle size of 1.2 micron, was prepared.

This mixture was then introduced into an alumina boat, which was placed into a tubular furnace having argon and hydrogen circulating therein.

The temperature was increased to 1,250° C. and maintained for 2 h.

The reaction mass was then permitted to cool in the inert atmosphere of the furnace, with the gaseous circulation being maintained until the temperature decreased to less than 600° C.

Three successive washes were carried out on the product obtained, by suspending it in water to eliminate any trace amounts of chloride.

The product obtained was cerium hexaboride having an X-ray diffraction pattern conforming to ASTM plate 11670.

There was no crystalline impurity attributable to the magnesium present in the industrial boron starting material.

A powder having a particle size of 40 microns, and of 30 microns following comminution for 2 min by ultrasound, was produced.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a rare earth boride, comprising directly reacting an admixture of at least one rare earth chloride and elemental boron by heating together, said at least one rare earth chloride being in hydrated state, cooling the reaction admixture and directly recovering product rare earth boride.

2. A process for the preparation of a rare earth boride, comprising directly reacting admixture of at least one rare earth chloride and elemental boron by heating together, cooling the reaction admixture to ambient temperature and directly recovering product rare earth boride.

3. A process for the preparation of a rare earth boride, comprising directly reacting an admixture of at least one rare earth chloride and elemental boron by heating together, cooling the reaction admixture and directly recovering product rare earth boride, said reacting step being carried out at a temperature which is above an ambient temperature of about 15 to 25° C. and said cooling step comprises cooling the reaction admixture to ambient temperature.

4. The process as defined by claim 2, wherein said reacting step is carried out at a temperature of from 1200° to 1500° C.

* * * * *